May 13, 1930.  E. PFLAUM  1,758,372

ANIMAL LOADING DEVICE

Filed March 13, 1928

INVENTOR.
Emil Pflaum
BY
ATTORNEY.

Patented May 13, 1930

1,758,372

UNITED STATES PATENT OFFICE

EMIL PFLAUM, OF PENDER, NEBRASKA

ANIMAL-LOADING DEVICE

Application filed March 13, 1928. Serial No. 261,296.

The invention relates to animal loading devices for trucks, and has for its object to provide a device of this character carried by the truck which may be easily and quickly positioned in a downwardly and rearwardly inclined position with side guards for loading and unloading animals.

A further object is to provide the rear end of the truck body with downwardly and rearwardly inclined removable bars having hook and eye engagement with the truck body, and the under side of the truck body with a reel having hingedly connected tread members thereon, and which tread members may be unreeled and passed downwardly over the inclined bars for forming a walk way for said animals. Also to provide a casing for the reel having a door through which access may be had to the reel. The reel casing forms means for preventing foreign matter from collecting on the reel and tread members carried thereby.

A further object is to form the side guard members from pivotally connected members of the lazy tong type whereby they may be formed into a compact package. Also to provide the guard members with frames detachably connected to opposite sides of tread members, for maintaining the guards braced and in spaced relation.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
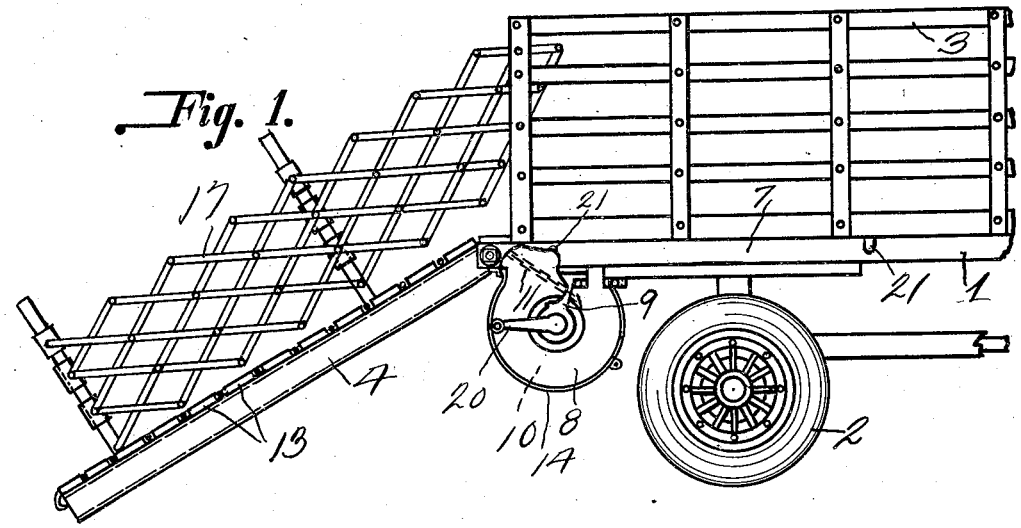
Figure 1 is a side elevation of a rear portion of a conventional form of truck, showing the device applied thereto.
Figure 2:
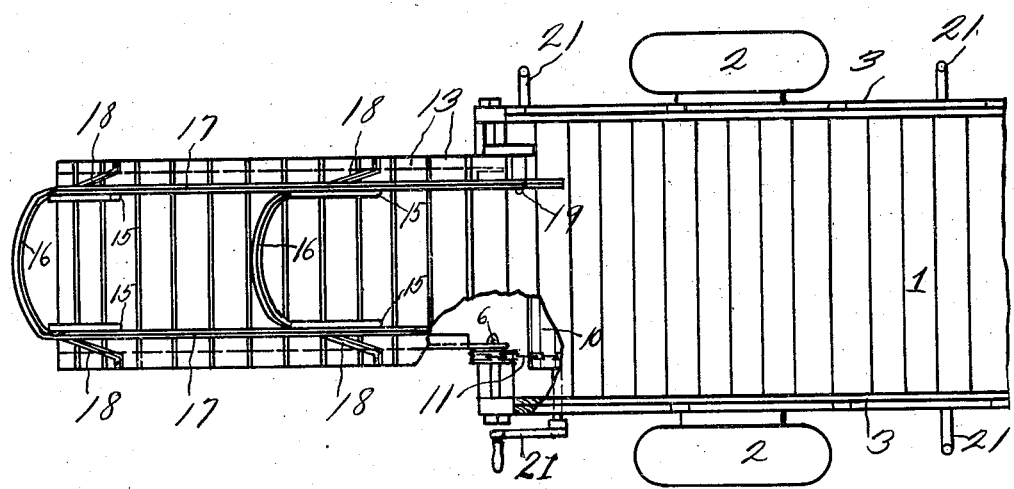
Figure 2 is a top plan view of the rear portion of the truck, showing the loading device in top plan view.
Figure 3:
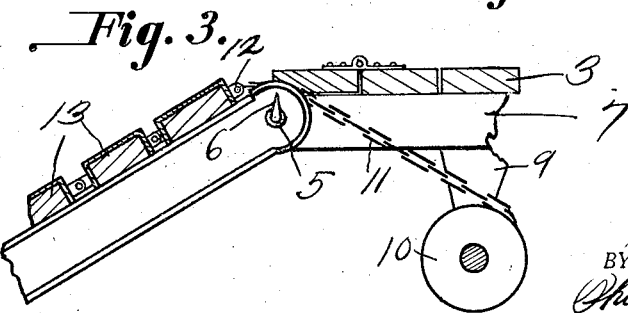
Figure 3 is a vertical longitudinal sectional view through the rear end of the truck body and adjacent portions of the loading device.

Referring to the drawing the numeral 1 designates the body of a conventional form of truck and 2 the rear wheels thereof. The truck is preferably provided with side boards 3 of conventional construction. Animals are transported at the present time in trucks of this general character, however no means is provided for loading and unloading said animals, and to obviate this difficulty the present device is primarily designed, and which device comprises downwardly and rearwardly inclined bars 4 adapted to rest on the ground to the rear of the truck, and which bars have their upper ends provided with eyes 5, which receive the hooks 6 carried by the rear ends of the side rails 7 of the chassis, and by providing the hook and eye connection it is obvious the bars can be easily and quickly placed in position or removed. Disposed within a casing 8 beneath the truck body 1 and supported by brackets 9 is a reel 10, and to which reel is connected chains 11, which chains extend upwardly and are connected to eyes 12 of the hingedly connected tread members 13, and which tread members, when the device is not in use, are adapted to be wound around the drum 10 for storage purposes. By placing the drum 10 in the casing 8, said casing will protect the device from becoming clogged with foreign matter, for instance mud. Access is had to the casing 8 by opening the hinged closure 14 of the casing 8. After the bars 4 are placed in position the tread member formed by the treads 3 are unwound from the drum 10 and passed downwardly over the bars 4 to the position shown in Figure 1, thereby forming a walkway for the animals, in leaving or entering the body of the vehicle.

Detachably mounted in apertures 15 of the tread members 13 are arched braces 16 and pivotally connected to the outer sides of the braces 16 are lazy tong members 17 forming sides for the loading device or platform. The arched members 16 may be further braced by removable brace bars 18, and which lazy tong sides 17 are detachably connected at 19 to the sides 3 of the wagon body, therefore it will be seen when the device is not in use the arched members 16 and sides 17 may be folded into a compact package. Drum 10 is provided with an operationg crank 20 adapted to be grasped by the operator for rotating the same. The opposite sides of the body 1 are provided with spaced hooks 21 on which the bars 4 may be supported when not in use, and it is obvious the side members 17 when folded into a compact package may be stored in a relatively small space within the body.

From the above it will be seen that an animal loading and unloading platform is provided for trucks and other vehicles and which device may be easily and quickly placed in position and removed therefrom, and when removed will be stored on the vehicle so it will form a part of the equipment of the vehicle, thereby allowing the vehicle to be used for other purposes than transporting animals.

The invention having been set forth what is claimed as new and useful is:

1. The combination with the rear end of a vehicle body, a reel beneath said body, of a loading platform, said loading platform comprising downwardly and rearwardly extending detachable bars carried by the body and a flexible tread member extending around the reel and forming means when unreeled for engaging the upper sides of the bars for forming a walk way and when reeled being entirely received on the reel beneath the vehicle body.

2. The combination with the rear end of an automobile truck body, of a loading and unloading platform, said platform, comprising downwardly and rearwardly extending bars, the upper ends of said bars having detachable hook and eye engagement with the body, a reel beneath the body, a flexible tread carried by said reel and extending upwardly and downwardly over the bars, said tread being entirely received and supported beneath the truck body on the reel.

In testimony whereof I hereunto affix my signature.

EMIL PFLAUM.